United States Patent [19]
Blaney et al.

[11] Patent Number: 5,544,011
[45] Date of Patent: Aug. 6, 1996

[54] BRACKET AND MODULE ASSEMBLY FOR A PORTABLE PERSONAL COMPUTER

[75] Inventors: Timothy J. Blaney, Fremont; Ronald A. Smith; Nicholas F. Talesfore, both of Los Gatos, all of Calif.

[73] Assignee: Apple Computer, Inc., Cupertino, Calif.

[21] Appl. No.: 182,279

[22] Filed: Jan. 14, 1994

[51] Int. Cl.⁶ .............................. G06F 1/16; H05K 5/00
[52] U.S. Cl. ........................................................ 361/683
[58] Field of Search ................... 364/708.1; 439/928, 439/4, 501, 928.1; 361/680–686, 724–727

[56] References Cited

U.S. PATENT DOCUMENTS

| | | | |
|---|---|---|---|
| 4,742,478 | 5/1988 | Nigro, Jr. et al. | 361/680 |
| 4,846,596 | 7/1989 | Haranishi | 361/686 X |
| 4,858,070 | 8/1989 | Buron et al. | 439/928 X |
| 4,941,841 | 7/1990 | Darden et al. | 361/685 |
| 5,202,817 | 4/1993 | Koenck et al. | 361/680 |
| 5,331,509 | 7/1994 | Kikinis | 361/686 |
| 5,408,382 | 4/1995 | Schultz et al. | 361/686 |

Primary Examiner—Michael W. Phillips
Attorney, Agent, or Firm—Blakely, Sokoloff, Taylor & Zafman

[57] ABSTRACT

A bracket and module for a portable personal computer. In one embodiment, the module contains a transmitter and a receiver, or transceiver, for allowing for communications between the portable personal computer and other stations in the network. The bracket may be mounted permanently to the bottom of the portable personal computer if desired, with very little effect on the overall shape or performance of the computer. The module may easily be attached and detached from the bracket. The module contains a handle such that when the module is latched in the bracket, the handle can be used to carry the personal computer. Also included is a door holder to hold open the door of the portable personal computer to expose a connector on the computer which mates with a connector coupled to the module.

9 Claims, 15 Drawing Sheets

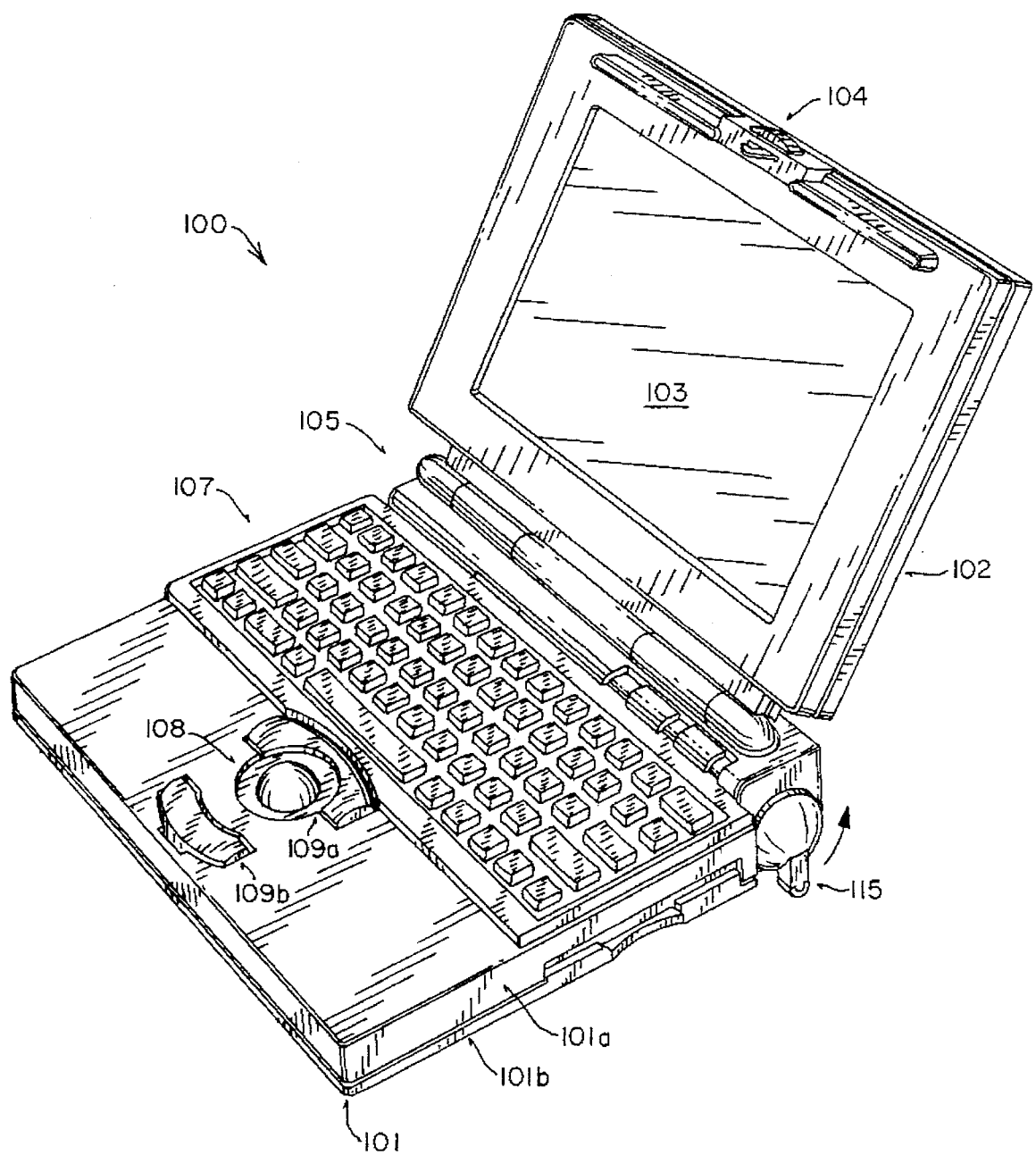
FIG _ 1

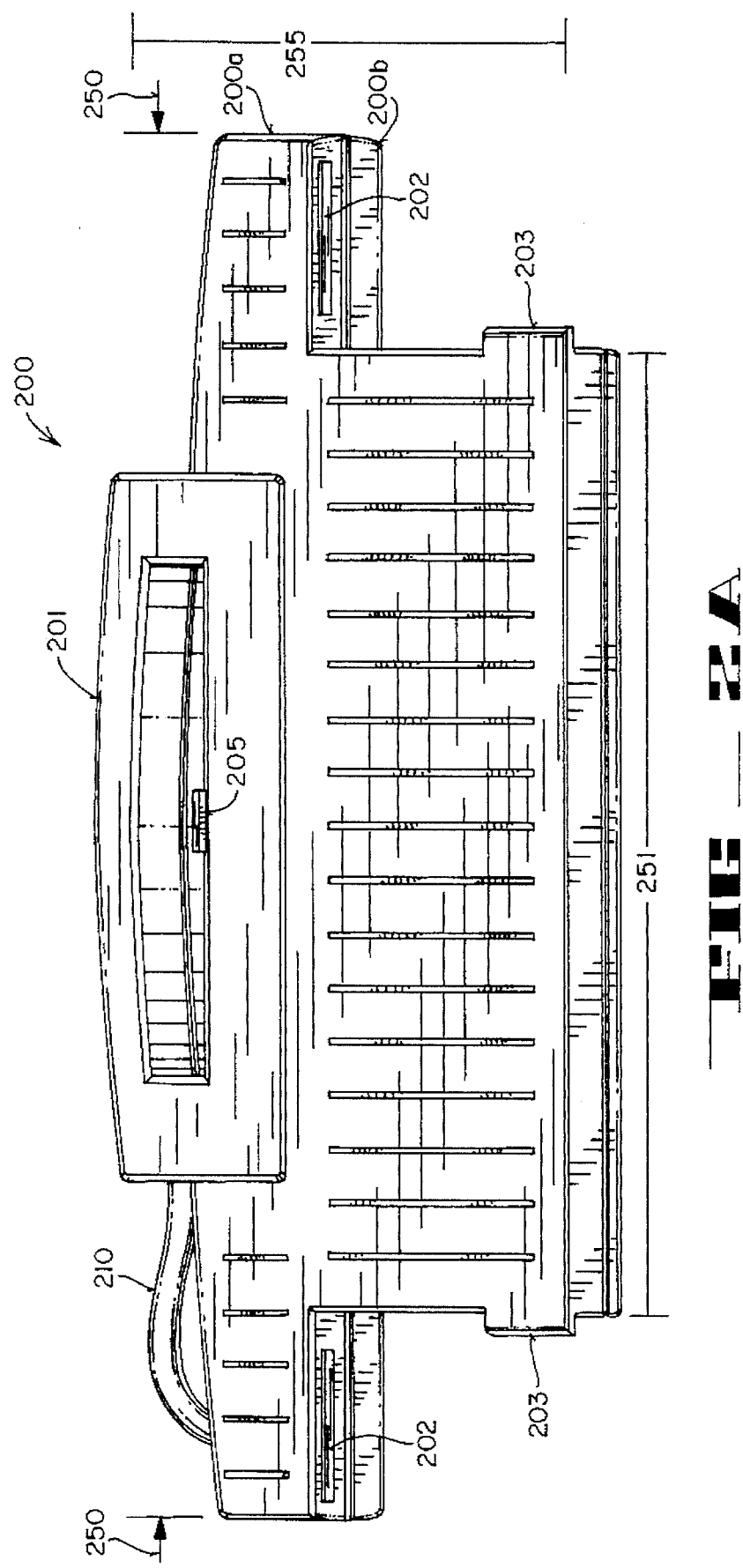
FIG—2A

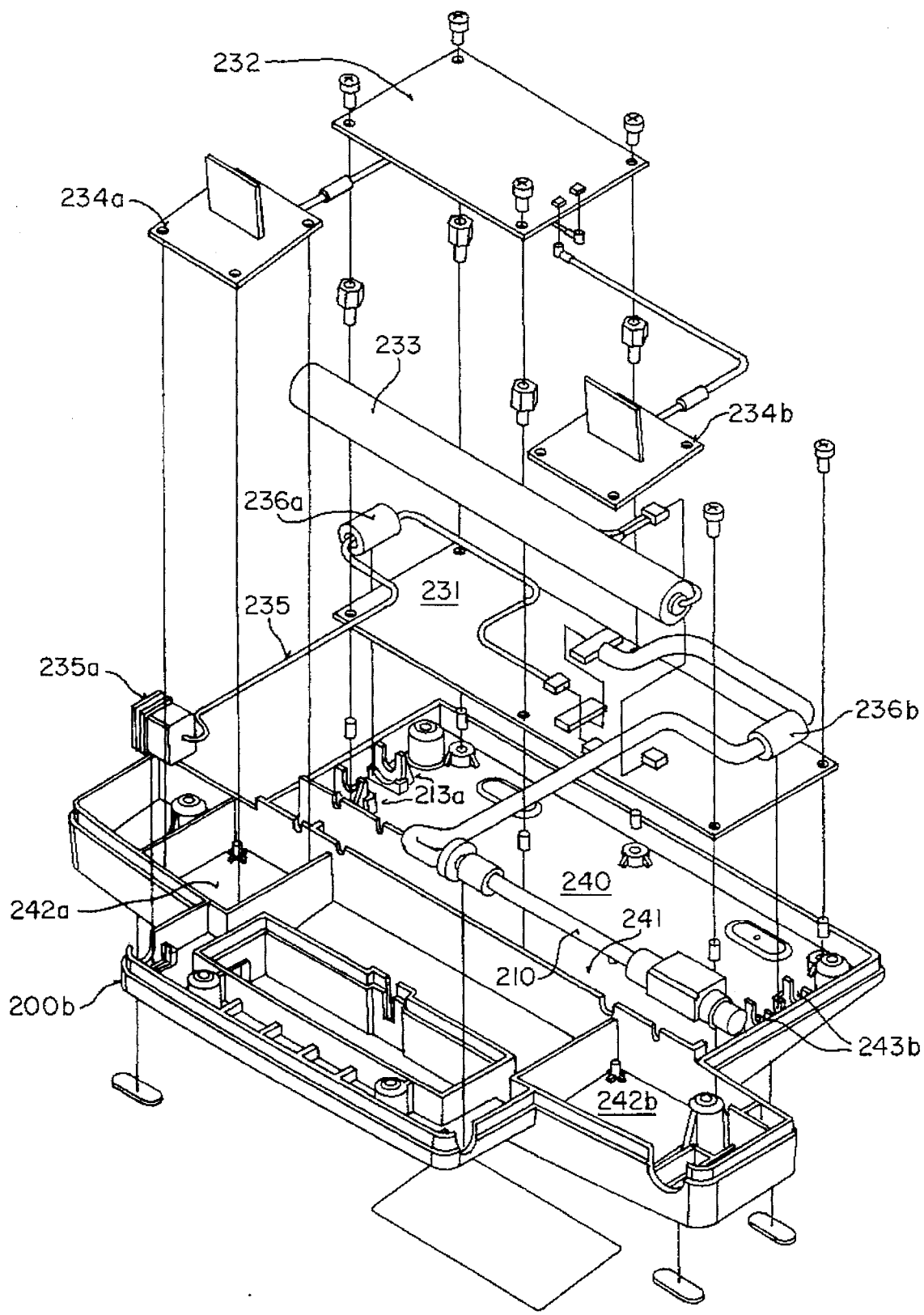
FIG_2B

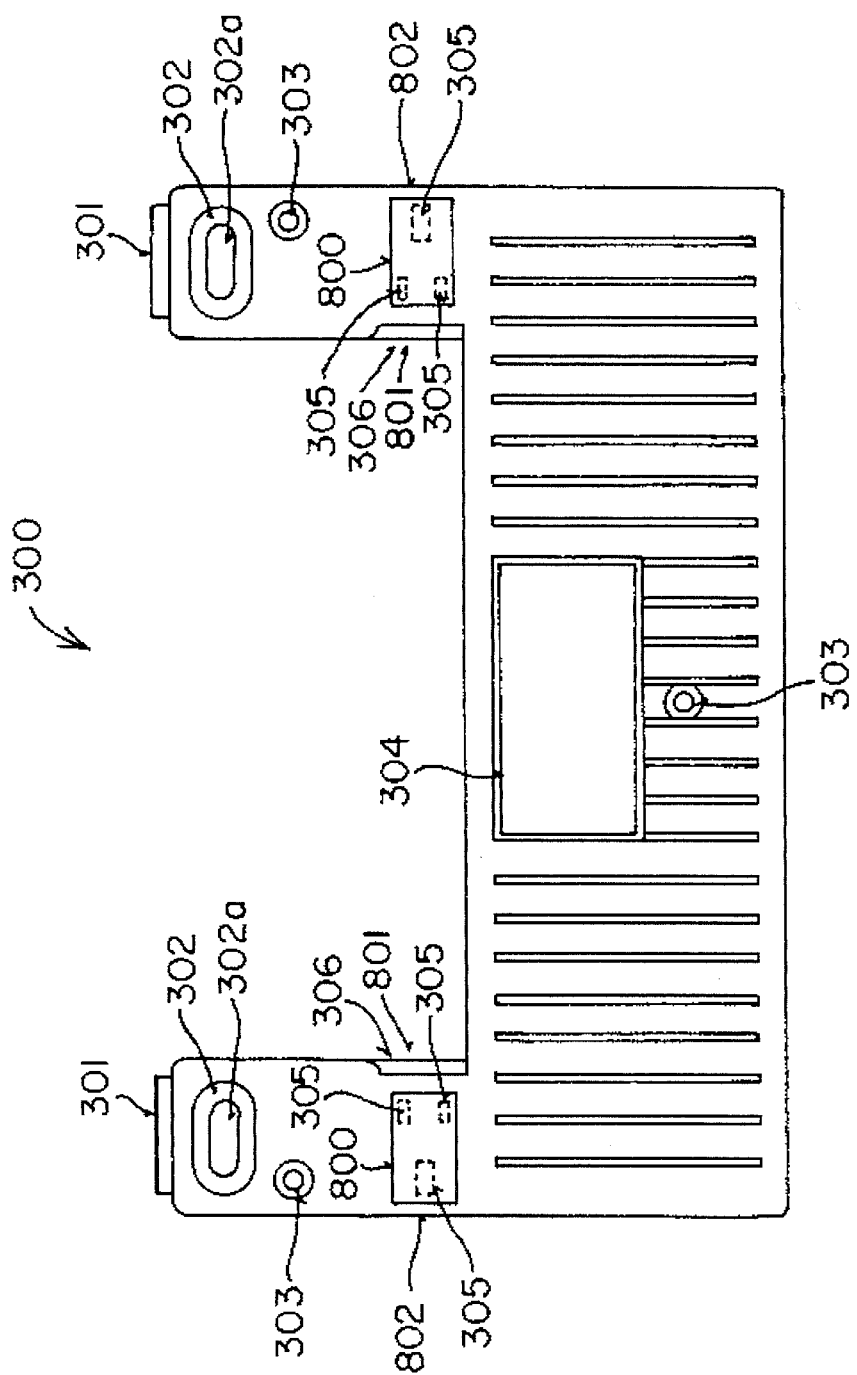

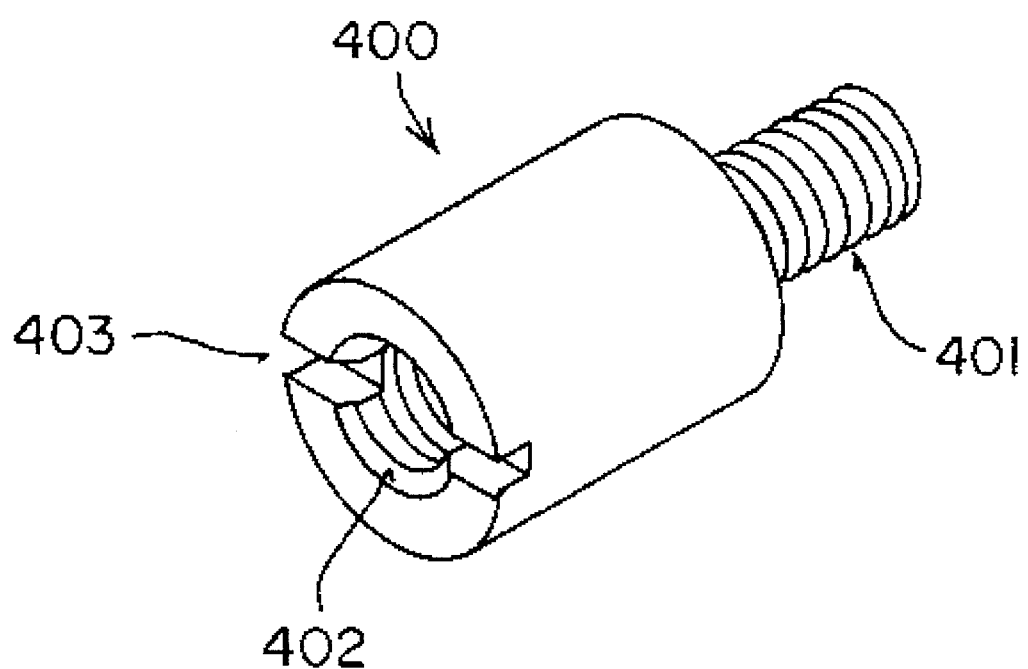
FIG_4

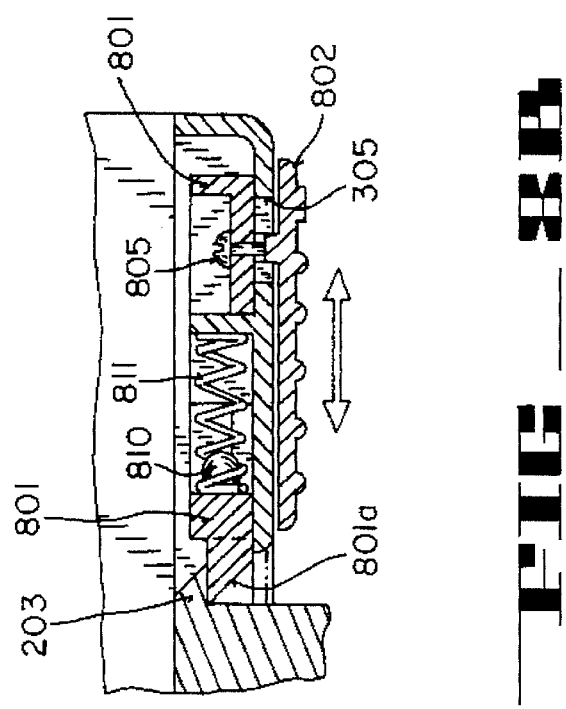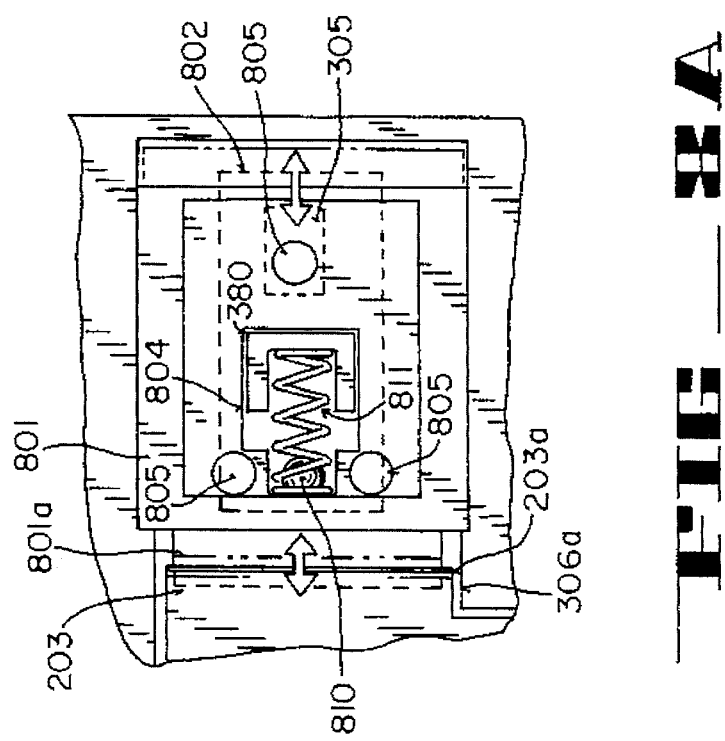
FIG-XA
FIG-XB

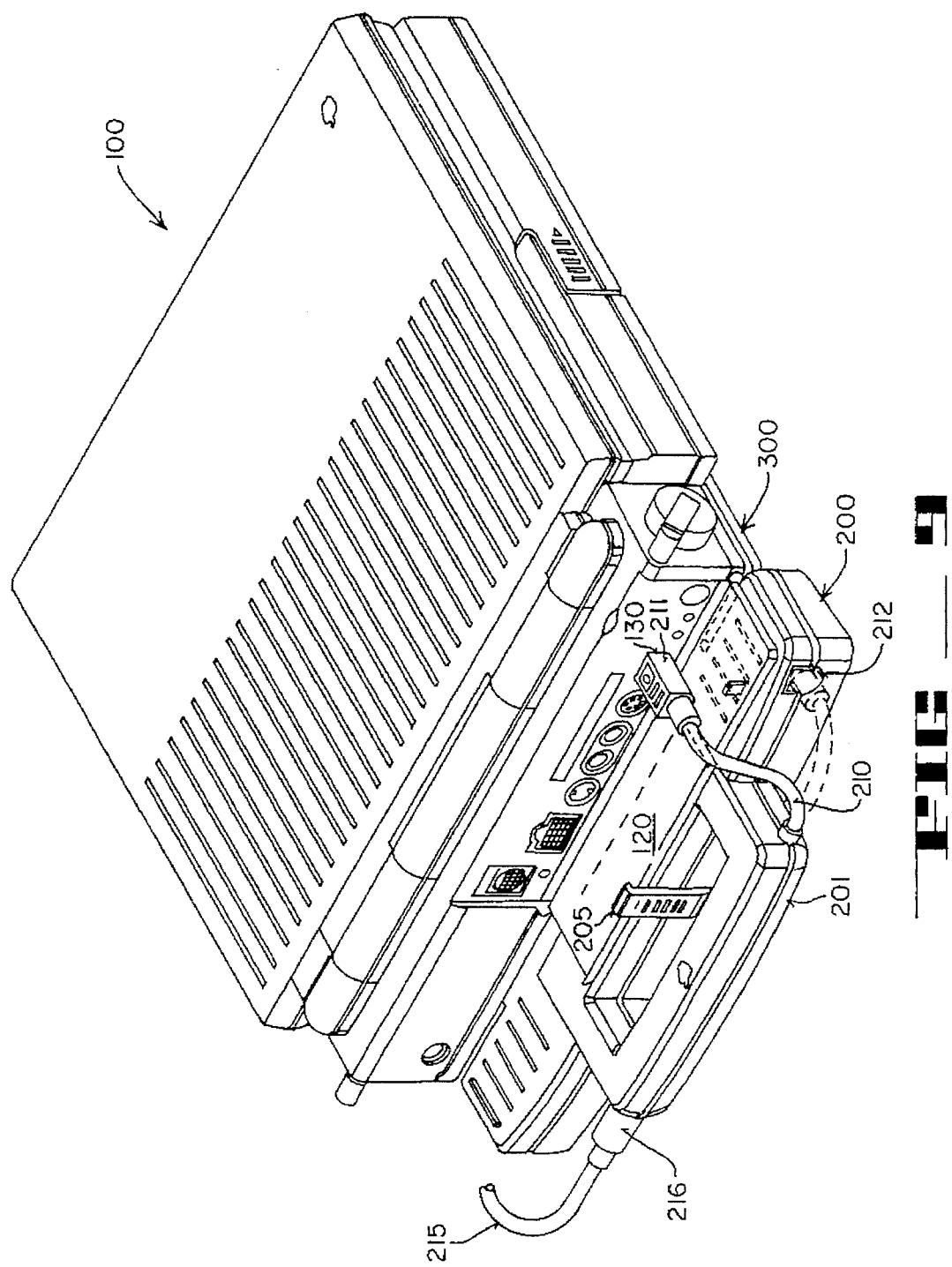
FIG_9

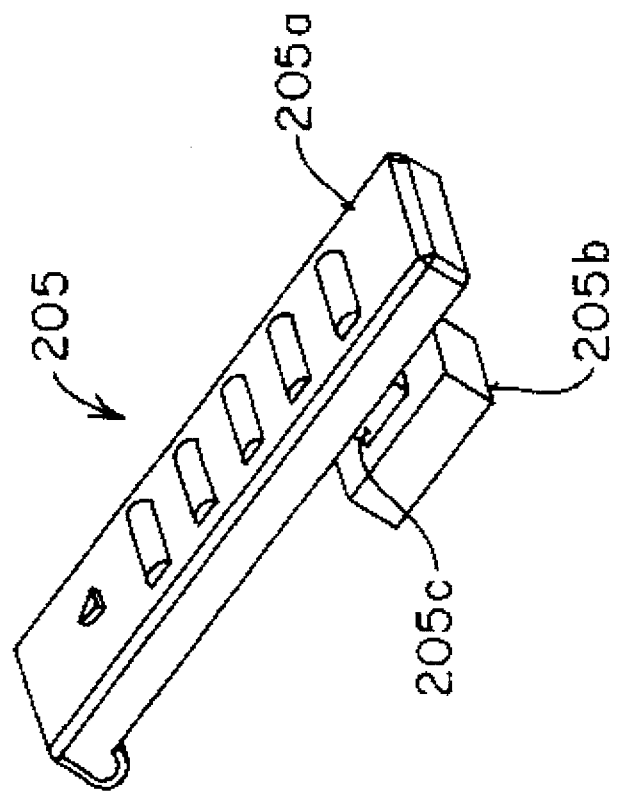
FIG — 10

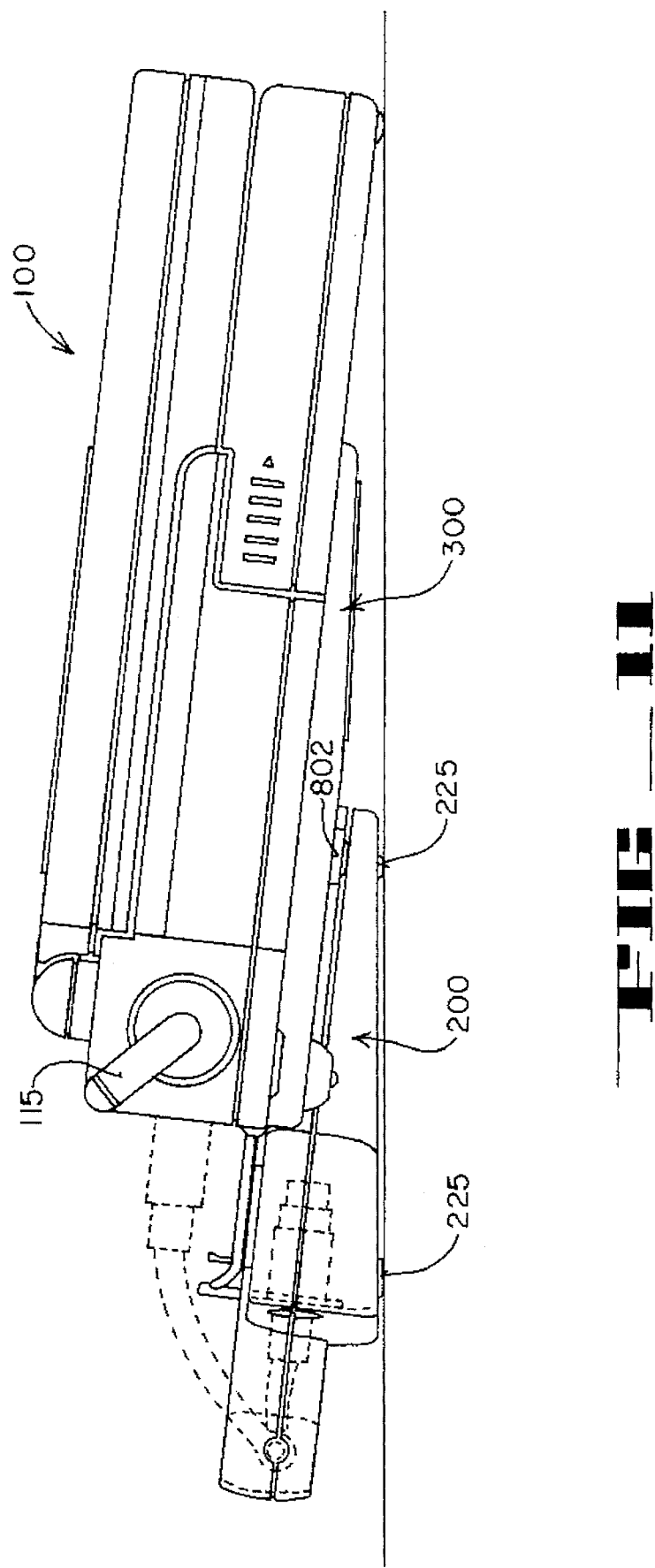

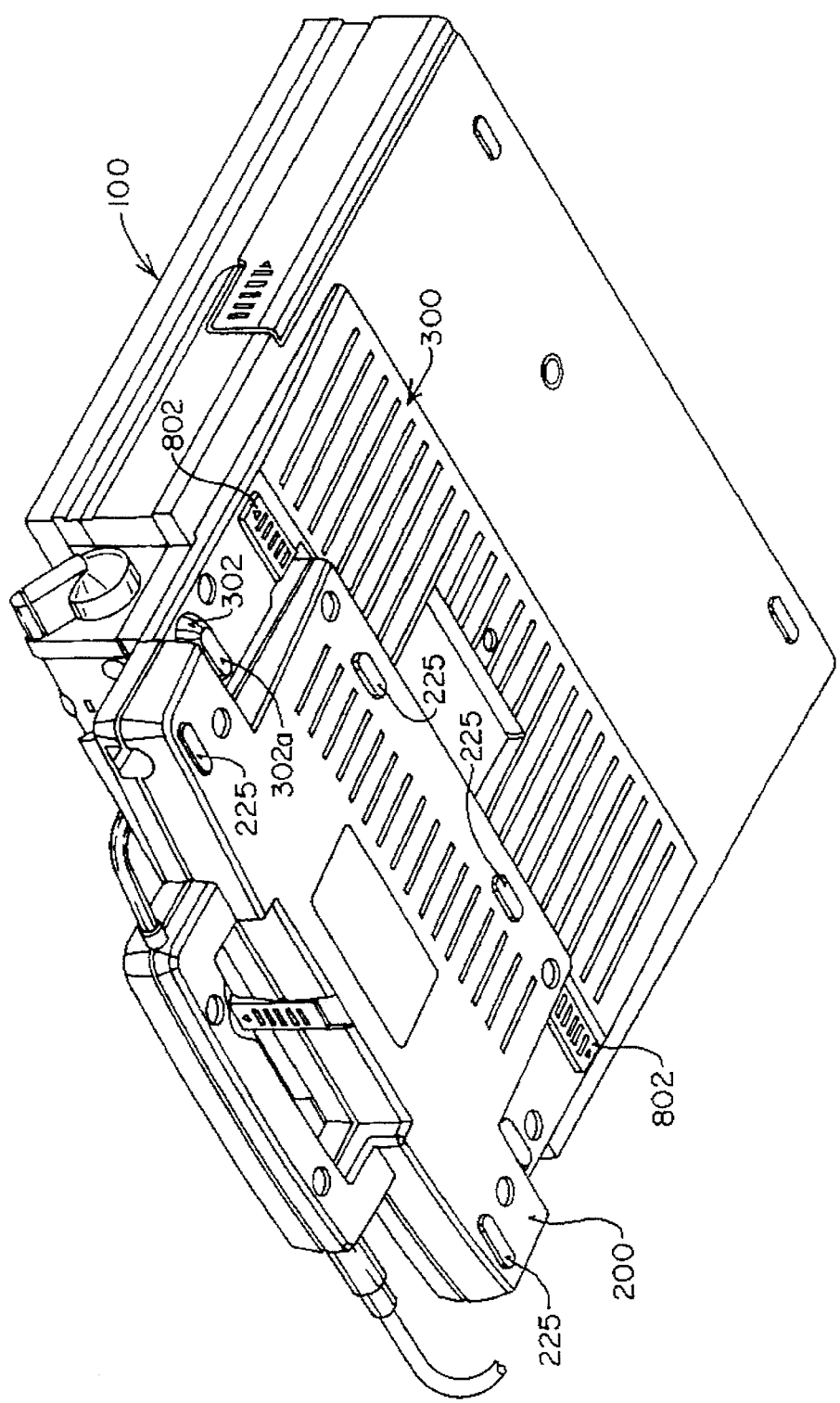

BRACKET AND MODULE ASSEMBLY FOR A PORTABLE PERSONAL COMPUTER

RELATED APPLICATIONS

The present application is related to co-pending U.S. patent applications Ser. No. 08/090,886, filed Jul. 12, 1993, entitled "Method And Apparatus For Transmitting And Receiving Encoded Data Using Multiple Frequency Coding" by Jeffery L. Mullins and Edward W. Geiger; U.S. patent application Ser. No. 08/110,807, filed Aug. 23, 1993, entitled "Folded Monopole Antenna For Use With Portable Communications Devices," by Herbert Schlegel, Jr., Timothy J. Blaney, and Charles M. Difronzo; and, U.S. patent application Ser. No. 07/997,880, filed Dec. 29, 1992, entitled "Scanning Method For Receiving A Transmission In A Communication System With Slow Frequency Hopping And Coding" by Paulette R. Altmaier and Peter J. Potrebic, which applications are assigned to the assignee of the present invention.

BACKGROUND OF THE INVENTION

1. Field of the Invention

The present invention relates to the field of attachable modules for personal computers, and more specifically to a radio frequency communications module for a portable personal computer.

2. Background Information

The above-referenced patent applications describe a method and apparatus for a wireless communication system for communications among a plurality of stations, for example, communication between a personal computer and, for example, one or more other personal computers, one or more peripherals such as a printer etc. In one embodiment, each station comprises the necessary hardware and software to allow for communication over the network of computers. Alternatively, a network of computers may comprise systems or components in addition to the stations themselves, which, for example, control all communication among the stations.

FIG. 1 shows an example of a portable personal computer (portable PC) which may be, for example, the POWERBOOK™, available from Apple Corporation. As their name implies, these computers are designed to be portable by nature of their small size, light weight, and battery operation. Such computers are ideal for allowing a user to perform virtually any task that can be performed on a non-portable personal computer, when the user is away from the home or office, or in any situation where the large size and requirement for connection to power would make use of a standard personal computer inconvenient, impractical, or impossible. In some systems, it is possible to incorporate the necessary electronics for the above-described communication system within the station itself. Alternatively, for some stations, the electronics can be housed in a separate, stand alone enclosure. For portable personal computers however, these alternatives may not be desirable or possible. Since portable PC's are designed using the minimum size possible, incorporation of the network communication electronics within the body of the portable PC may be impossible or undesirable due to the increase in size of the PC. A stand alone enclosure would increase the number of separate components which must be carried around. Additionally, a method and apparatus for providing the necessary electronics for existing portable PC's is desirable. Therefore, it is desirable to provide a separate attachable housing for the network electronics to provide for communication with the network of computers. It will be appreciated that in many situations, it will be necessary or desirable to allow for communication with stations in the network while retaining the high portability of the portable PC, so that any such housing itself should not hinder that portability. In other instances in which network communication is not required, a method and apparatus for coupling a portable PC to the network should allow the user to easily remove or detach the electronics from the portable PC. Therefore, what is needed is a module for housing the communications electronics. The module should have only a minimal impact on the size and shape of the portable PC and should have little or no impact on the normal mode of operation. Further, what is needed is a module which is easily attachable and detachable, so that it may be coupled to the portable personal computer or decoupled from the portable personal computer depending on need. Further, the method of attaching and detaching the module and any associate bracketing means should not require the user to open up the main body section each time the module and/or the bracket is removed. Finally, other features, which allow for connection of the module to the portable personal computer in a neat and orderly manner are desirable.

SUMMARY OF THE INVENTION

The present invention provides a bracket and module assembly for a portable personal computer. The bracket is attached to the portable personal computer using inserts which replace the screws commonly found in the body section of the portable personal computer. The inserts hold together the body of the personal portable computer and, additionally, allow for attaching and detaching the bracket without opening the body of the computer. The module comprises one or more tabs which fit into one or more slots on the bracket. The module and/or the computer with bracket attached is pivotal about the tab and slot to allow for one or more latches to be engaged to hold the module in place. The module further comprises a handle, which has sufficient mechanical strength so that the computer may be carried by the handle when the module is attached. The module also comprises a holder for holding open the connector door on the portable personal computer.

Other features and advantages of the present invention will be made apparent from the detailed description which follows.

BRIEF DESCRIPTION OF THE DRAWINGS

The present invention is illustrated by way of example and not limitation in the accompanying figures in which:

FIG. 1 illustrates a portable personal computer upon which the module and bracket of the present invention may be employed.

FIG. 3 illustrates a bottom view of the bracket of the present invention.

FIG. 4 illustrates the fastener by which the bracket 300 may be attached to the portable personal computer 100.

FIG. 9 shows a back view of the bracket and module assembly of the present invention attached to the computer of FIG. 1.

FIG. 10 shows the door retaining tab of the present invention.

FIG. 11 shows a side view of the module and bracket assembly of the present invention attached to the computer of FIG. 1.

FIG. 12 shows a bottom view of the bracket and module of the assembly of the present invention attached to the computer of FIG. 1.

DETAILED DESCRIPTION

Figure 2H:
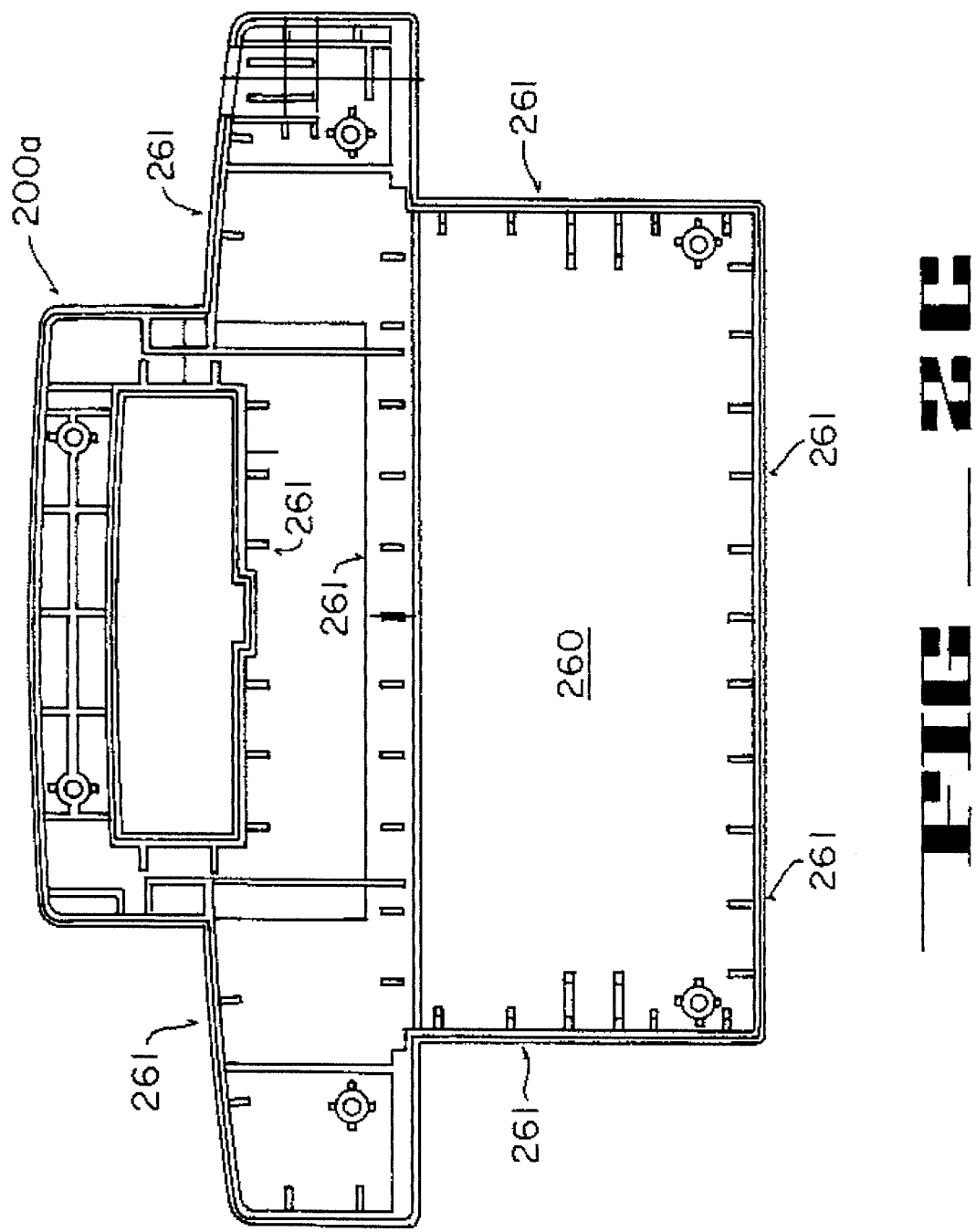
FIGS. 2A–2C illustrate the module of the present invention.

A bracket and module assembly for a portable personal computer is disclosed. In the following description, numerous specific details are set forth such as specific components, shapes, dimensions, materials, arrangements, couplings, fasteners, etc. in order to provide a thorough understanding of the present invention. It will be obvious, however, to one skilled in the art that these specific details need not be employed to practice the present invention. In other instances, well known materials or methods have not been described in detail in order to avoid unnecessarily obscuring the present invention. Moreover, while the present invention is described with reference to a module containing a radio frequency (RF) transceiver for use in a portable personal computer system, it will be apparent to those skilled in the art, however, that modules containing other types of systems or components, for any electronic system may be made according to the present invention. In a currently preferred embodiment, except as noted, the bracket and module of the present invention described below is made of polycarbonate formed by injection molding. The feet and door holding tab described below are, in a currently preferred embodiment, polyurethane, and the latch slider described below is molded of polyester with a 5% TEFLON™ (fluorocarbon polymer) loading. The cables and connectors are any of the standard, commonly available such cables and connectors. It will be understood that other similar types of materials may be used in place of these currently preferred materials. For example, the bracket and module may be made of ABS plastic, styrene, or any preferably plateable plastic or similar material.

FIG. 1 illustrates a portable personal computer 100 in an open position. Portable personal computer 100 comprises body 101 and cover 102. As shown, body 101 comprises upper body portion 101a and lower body portion 101b which are held together typically by screws extending through the underside of lower body portion 101b. As shown, body 101 comprises keyboard 107, track ball 108 and control buttons 109a and 109b. Cover 102 which is attached to the body 101 by hinge 105 comprises display screen 103 and latch 104 which holds the portable personal computer 100 in a closed position when the cover 102 is turned in the downward position about hinge 105. Also shown is leg 115 which, together with an identical leg on the other side (not shown) lifts the back portion of portable personal computer 100 approximately an inch off the surface upon which computer 100 is resting, to provide a comfortable tilt angle of approximately 6°.

FIG. 2A shows an angled front view of module 200 of the present invention. As described previously, module 200 comprises a transmitter for transmitting data to, and a receiver for receiving information from, other modules 200 or other stations in the network. It will be appreciated that in a currently preferred embodiment, the transmitter and receiver are comprised in a single transceiver unit and reference herein to a transmitter and receiver is understood to encompass a transceiver unit. Likewise, reference herein to a transceiver unit is understood to encompass embodiments having separate transmitter and receiver units. Module 200 comprises an upper portion 200a and lower portion 200b which, in a currently preferred embodiment are held together by screws attached to the underside of portion 200b. Thus, in manufacturing, the transceiver, cables, and associated electronics are placed in the portion 200b and, upon completion, portion 200a is placed on top of portion 200b and screwed into place. As shown, module 200 comprises handle 201, slots 202, and tabs 203. In an alternate embodiment handle 201 may be omitted so that module 200, when attached to computer 100, extends only minimally beyond computer 100. In a currently preferred embodiment module 200 has a length 250 of approximately 10 inches across the upper portion having the slots 202 and a length 251 of approximately 7 inches in the lower portion. Tabs 203 extend approximately 0.20 inches from the edge of module 200. Module 200 has a depth 255 of approximately 6¼ inches. Briefly referring to FIG. 6, module 200 has a height 260 of approximately 1⅛ inch at the end having handle 201, and a height 261 of approximately ⅝ inch at the end having tabs 203.

FIG. 2B shows an assembly drawing, showing the placement of various components into the bottom portion 200b of module 200. As shown, controller board 231 and radio board 232 are placed in a main compartment 240. Battery pack 233, which in a currently preferred embodiment comprises 3 rechargeable AA type batteries, or equivalent, is placed in compartment 241. In a currently preferred embodiment, the RF transceiver of the present invention uses diversity reception to improve the reception range. Therefore, two antennas 234a and 234b are placed in compartments 242a and 242b respectively. As shown, data cable 210 exits the module 200 on one side, while power jack 235a and its associated wiring 235 exits the handle of module 200 on the other side. The power jack 235a can be used to couple module 200 to an external power source, to allow the module 200 to run off the external source and to charge battery pack 233. Also as shown, to filter interference, both data cable 210 and power wiring 235 are routed through ferrites 236a and 236b, which are placed in stand-offs 243a and 243b respectively. In a currently preferred embodiment, the main compartment section 240 is plated with 40 micro inches of copper, which is next plated with 10 micro inches of nickel in a currently preferred embodiment. This plating acts as a shield so that internal lines are not effected by electromagnetic interference (EMI), and to ensure that the module 200 complies with FCC regulations regarding leakage of EMI. Other portions, particularly compartments 242a, and 242b are left unplated to allow for transmission and reception of signals necessary for communication with a network. FIG. 2C shows a top down view of the upper portion 200a of module 200. In a currently preferred embodiment, section 260, which covers main section 240 of bottom portion 200b, is also plated with 40 micro inches of copper and 10 micro inches of nickel, to provide complete shielding. Also in a currently preferred embodiment, upper section 200a comprises a plurality of ribs 261 (not all ribs 261 are labeled in FIG. 2C for clarity) around the perimeter of the compartments of module 200 to provide for a slight interference fit. With this interference fit, compartment 240 of bottom portion 200b and 260 of upper portion 200a are completely and tightly sealed to prevent EMI leakage as described above.

FIG. 3 shows a bottom view of bracket 300 of the present invention. As shown, bracket 300 comprises tabs 301, feet 302, screw holes 303, and opening 304. Opening 304 allows for viewing of a plate having FCC information, serial number, specifications, etc. which is typically found on computer 100. Feet 302 comprise oval members extending approximately ¼ inch from the surface of bracket 300 having rubber members 302a, extending approximately an additional 1/16–1/8 inch, in the center thereof. Also shown in FIG. 3 are portions of latch 800 including latch tab 802 and a portion of latch slider 801 disposed within indent 306. Underneath each tab 802 are three openings or slots 305 in bracket 300, shown in dashed outline form. The latch 800 will be described in more detail later with reference to FIGS. 8A–8C. Latch slider 801 engages tabs 203 of module 200 when the module 200 is coupled with bracket 300 in a manner to be described in conjunction with FIGS. 6 and 7.

As noted earlier, personal computer 100 of FIG. 1 comprises screws which extend through the bottom portion 101b and hold portions 101a and 101b together. Screw holes 303 of bracket 300 are positioned such that they overlie three of these screws. In one embodiment, the screws of the personal computer may be removed, bracket 300 may be placed over the bottom of body portion 101b, and then screwed into place using screws of the same pitch and diameter as those used to hold body 101 together, with a slightly greater length. However such an arrangement may not be desirable if the bracket 300 is to be removed frequently from personal computer 100, as removal of the screws in essence partially opens the body of computer 100 which may increase the risk of damage to the internal electronics of computer 100. Therefore, in a currently preferred embodiment, referring to FIG. 4, mounting insert 400 of the present invention is used. As shown, mounting insert 400 comprises a male portion 401 and female portion 402. Male portion 401 is essentially equivalent to the screws used to secure bottom portion 101b to upper portion 101a of body 101 of personal computer 100 of FIG. 1. That is, the length, diameter, and pitch are the same for this portion as for the screws used in the personal computer 100. In a currently preferred embodiment, the screws which are equipped with personal computer 100 are removed in the places corresponding to the screw holes 303 of bracket 300 of FIG. 3. A mounting insert 400 is then placed in each of the screw holes by placing a standard slot screw driver into slot 403 and turning clockwise. At this point, the mounting inserts 400 hold the upper section 101a and lower section 101b together, regardless of whether bracket 300 is placed on the computer 100. Next, when it is desired to place the bracket 300 on the computer, bracket 300 is placed such that the screw holes 303 are aligned over the mounting inserts 400. Bracket 300 comprises raised rims around openings 303 on the underside of bracket 300 so that bracket 300 is essentially self aligned with the openings in the bottom of computer 100 into which mounting inserts 400 were placed. Because of this method of self alignment, bracket 300 can be placed over the bottom of computer 100 in rough alignment, and moved slightly until it drops into place. At this point, bracket 300 is secured to personal computer 100 by three screws which are screwed into mounting inserts 400. In some cases, it is possible to use the screws which were removed from computer 100 if they are of the correct length. In this manner, bracket 300 can be removed and replaced on the personal computer, as desired, without ever having to unscrew the mounting inserts 400 holding the upper portion 101a and lower portion 101b of computer 100 together.

It should be noted that in addition to their use in securing bracket 300 of the present invention, mounting inserts 400 can be used in place of one or more of the screws holding portions 101a and portions 101b of the body 101 of personal computer 100 together, to allow for attachment of any number of computer accessories such as holding straps, etc. thereby allowing easy attachment and removal of such accessories, without significant alteration of the computer 100 and without the need to open up the body 101 of computer 100.

Figure 5:
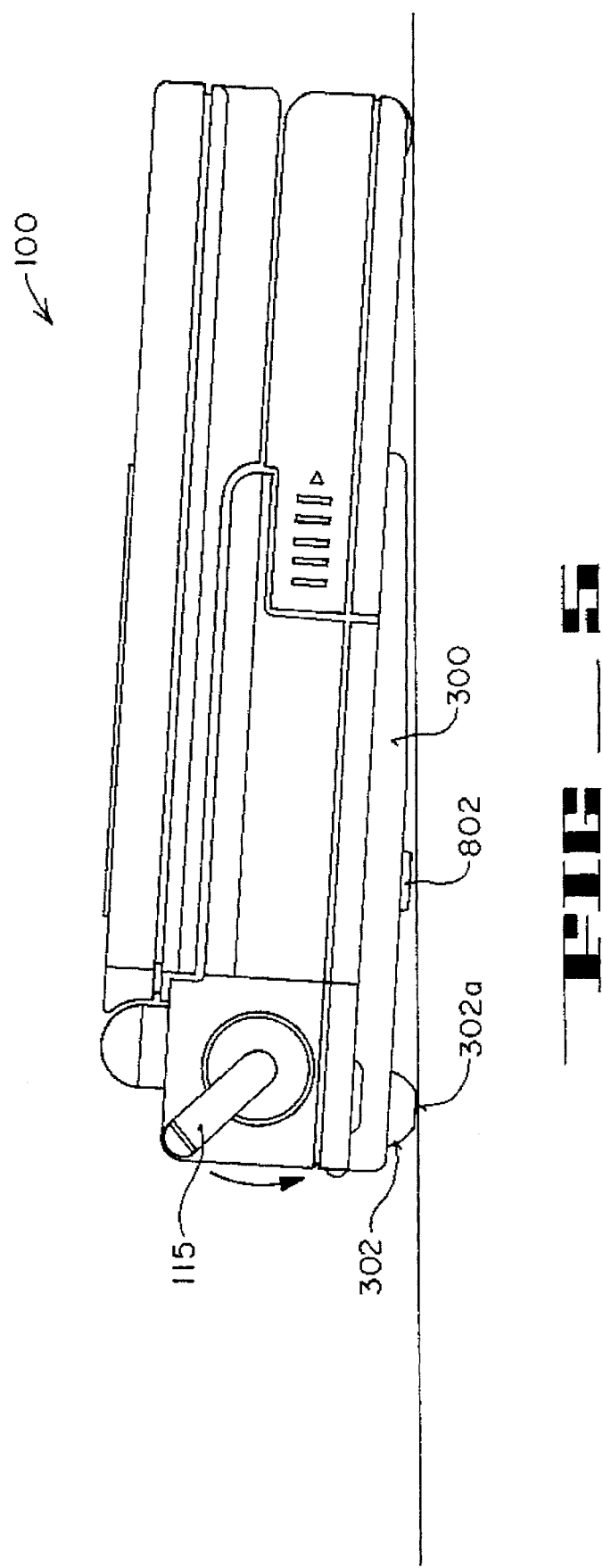
FIG. 5 shows a side view of the bracket of FIG. 3 when attached to the personal computer of FIG. 1.

FIG. 5 shows personal computer 100 with bracket 300 attached. In a currently preferred embodiment, the combined thickness of bracket 300 and leg 302 is approximately ½ inch. This is less than the distance by which leg 115 lifts the back end of the computer 100 when the leg 115 is in the down position as indicated by the arrow. Therefore, when leg 115 is turned downward (for example as shown in FIG. 1) the presence of bracket 300 has no effect on the tilt angle of the personal portable computer 100. As compared with a portable personal computer 100 lying flat on a surface with leg 115 in the up position as shown, the presence of bracket 300 adds a tilt angle of approximately 2°.

Figure 6:
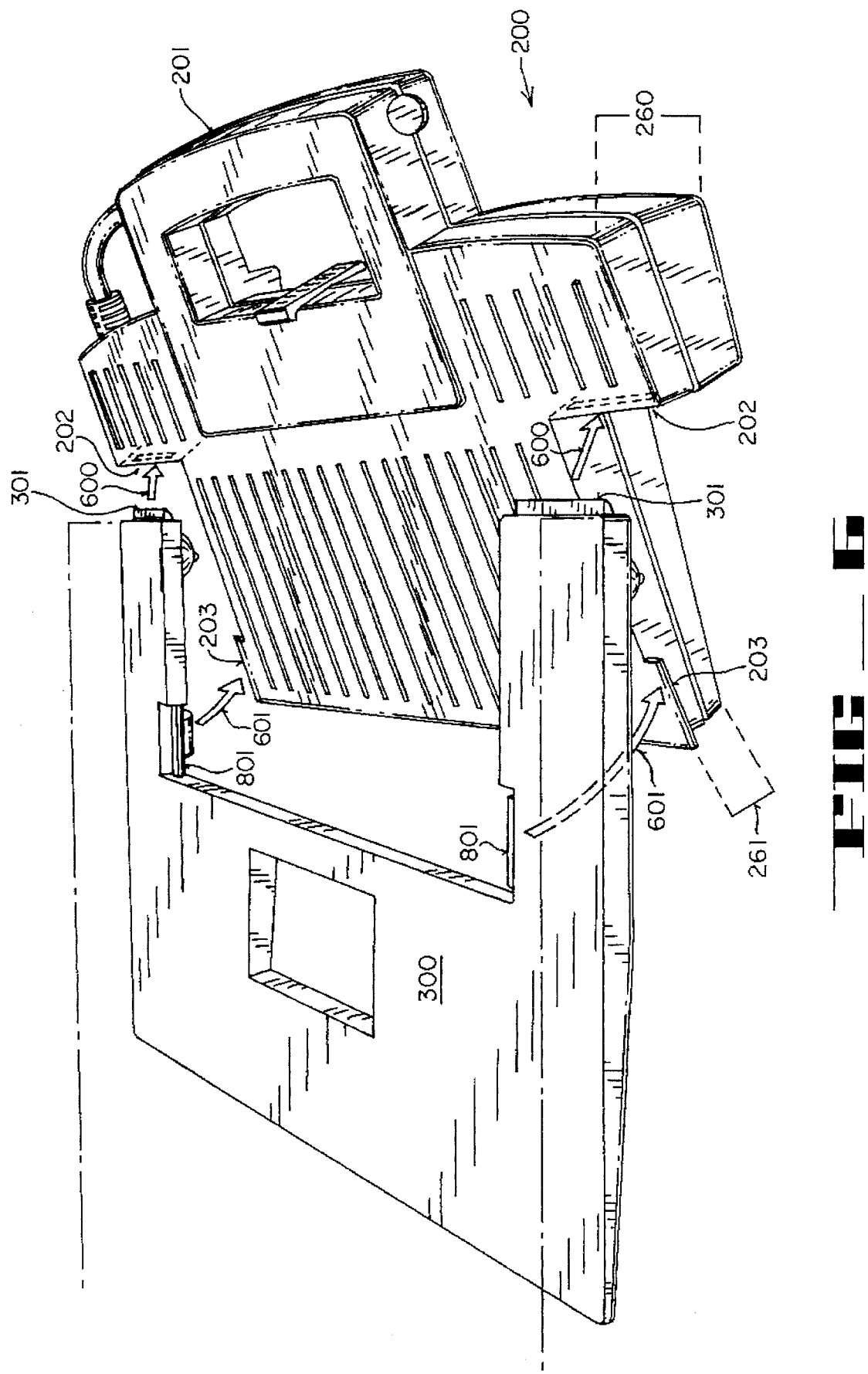
FIG. 6 illustrates the method of latching the module of FIG. 2 in the bracket of FIG. 3.

FIG. 6 illustrates the placement of module 200 into bracket 300. In FIG. 6, computer 100 is not shown, but is understood to be attached to bracket 300 as shown and described previously. To mount module 200 into bracket 300, first, tabs 301 are placed in slots 202 as shown by arrows 600. This can be accomplished by placing module 200 on a flat surface and then manipulating personal computer 100 (and therefore the attached bracket 300) to position tabs 301 in slots 202. It should be noted here that the long, thin geometry of tabs 301 make it difficult to misalign the bracket 300 to module 200 engagement. Therefore, when bracket 300 is manipulated as described above, either both of tabs 301 engage slots 202 or neither do during alignment. This prevents engagement of only a single tab 301/slot 202 thus preventing misalignment. Next, the end of bracket 300 opposite tabs 301 is rotated or pivoted about the slots 202 and tabs 301 as shown by arrows 601, such that tabs 203 engage latches 800. As shown, the upper portion of tabs 203 are angled at approximately 45°. Furthermore, as will be described in more detail below, a portion 801a of latch slider 801 is also angled at approximately 45° such that the tabs 203 push the latch sliders 801 inward as module 200 is moved in the direction shown by arrows 601. It will be appreciated that the manner of coupling module 200 to bracket 300 can be accomplished by any means convenient to the user. For example, the user can hold the personal computer 100 in the front with one hand, while module 200 is manipulated to engage tabs 301 into slots 202. Next, module 200 and/or bracket 300 is rotated to engage tabs 203 with latches 800.

It will be appreciated that other arrangements of the tabs, slots, and latches or other similar structures may be used. For example, in alternative embodiments a slot similar to slots 202 may be placed on the bracket 300 and a tab similar to tabs 301 may be placed on the module 200. As a further exemplary alternative, a peg or similar element can be used in place of tab 301 with a corresponding opening in place of slot 202. Of course, a peg may not have the above described advantage of being difficult to misalign as is the case with the long, thin tabs 301. Additionally, in some arrangements only a single such tab/slot, peg/opening, etc. will suffice. What is necessary is that the specific members employed allow for rough alignment of the module 200 and bracket 300, and allow for rotation or other movement such that the user can easily guide the module 200 and/or bracket 300 until the latches or other holding or locking means can engage as described. Similarly, if desired the latches may have other shapes and configurations. For example, magnetic latches or other latching means may be utilized. Additionally, the latches may be placed in module 200 with tabs similar to tabs 203 placed on bracket 300. However, the embodiment shown has the advantage that the latches and tabs do not use up any of the internal space of module 200, so that the entire internal area of module 200 may be used for electronic components. Furthermore, the embodiment shown has the advantage that latch tabs 802 are easily accessible at the outer edges of the bracket 300. It will further be appreciated that the exact shape of the module 200 and bracket 300 assembly need not be as shown. All that is necessary is that the module 200 may easily be engaged and disengaged from the bracket 300 and that the module 200 is held securely in place when engaged. As described earlier, it is preferable that the bracket 300 be shaped such that appropriate openings can be placed over a sufficient number of the preexisting screw holes in the bottom of personal computer 100, so that the bracket 300 may utilize these same screw holes as described earlier. Further, it is desirable that the bracket 300 have an opening such as opening 304, or be shaped and positioned such that the earlier described plate having FCC and other information, be visible. As a further alternative, bracket 300 need not be a structure separate from computer 100. For example, tabs 301, and latches 800 may be made an integral part of computer 100. That is, a computer 100 having any of the above described means for attaching a module 200 the alternatives described herein, and/or other equivalents thereof, is considered to employ a bracket 300 within the scope of the present invention.

Figure 7:
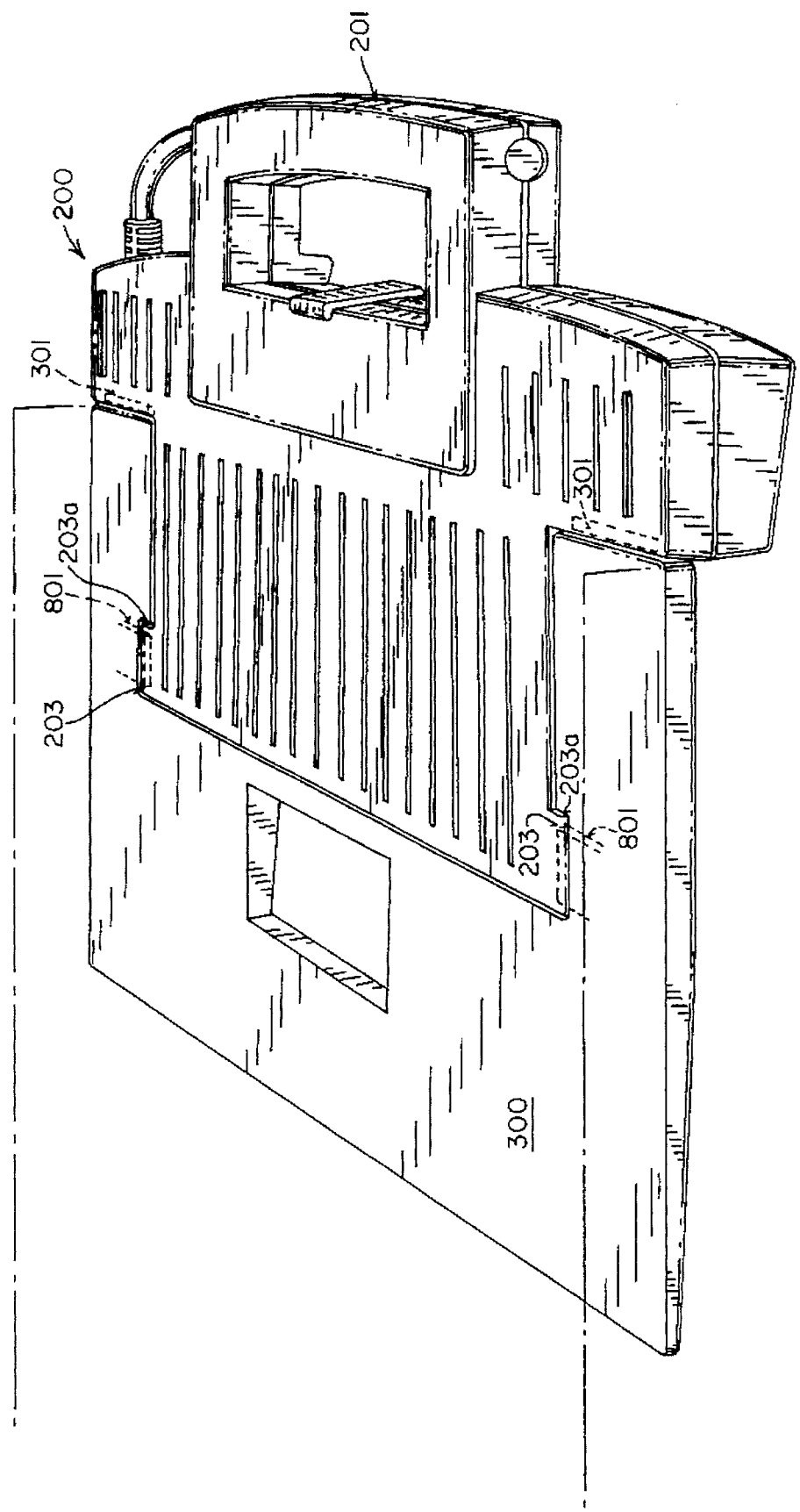
FIG. 7 illustrates the module and bracket of the present invention once latched.

FIG. 7 shows module 200 engaged in bracket 300, again with computer 100 not shown for purposes of illustration. However, as with FIG. 6 it is understood to be present, attached to bracket 300. Tabs 301, shown in dashed outline form, are within slots 202. Further, latch sliders 801 also shown in dashed outline form are extended underneath tabs 203. The latch sliders 801 when extended and underneath tabs 203 prevent any downward movement of the end opposite handle 201 of module 200. Furthermore, motion in the opposite direction is prevented by the bottom of computer 100. Outward motion (i.e., motion of module 200 to the right in FIG. 7) is prevented by the portions 203a of tabs 203 which contact the upper edge of indent 306 of bracket 300 (indent 306 may best be seen in FIG. 3). In a currently preferred embodiment, the clearance around tab 203 and around tab 301, is approximately 1/32 inch per side. This amount of clearance allows for placement of module 200 in bracket 300 without an excessively tight fit, but is sufficiently tight to prevent excessive movement or rattling. If desired, to further restrain the motion of module 200 and bracket 300 when engaged, a compressive material may be placed in slots 202 of module 200 so that tabs 301 contact and compress the material as the bracket 300 and module 200 are engaged.

Figure 8E:
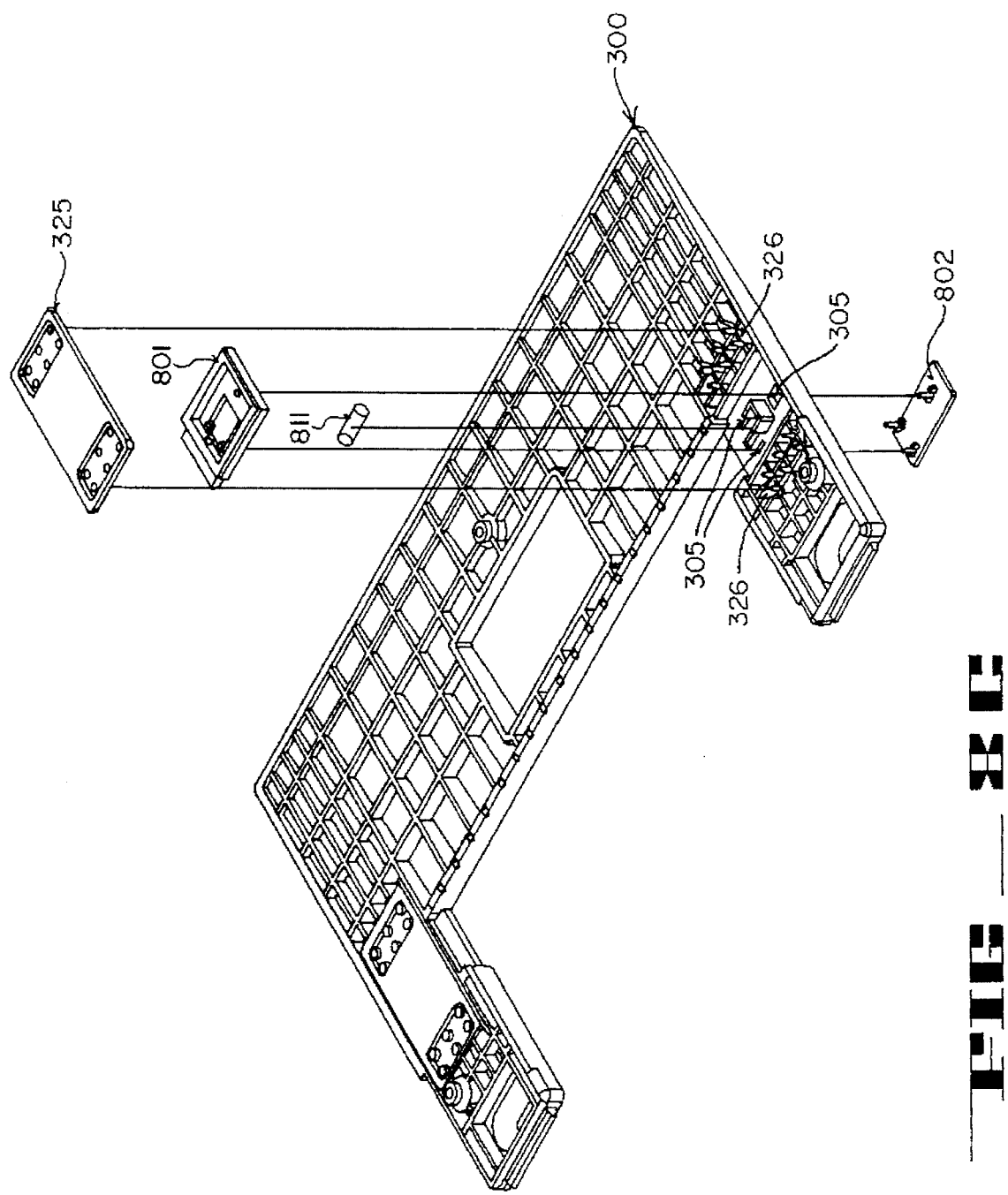
FIGS. 8A–8C show the latch of the present invention.

FIGS. 8A and 8B show top and side cutaway views, respectively, of latch 800 of the present invention. Referring to FIG. 8A, latch slider 801 comprises portion 801a which secures tab 203. As mentioned earlier, latch slider 801 is molded of polyester with a 5% TEFLON™ (fluorocarbon polymer) loading to allow for sliding without excessive friction or wear of parts. Latch slider 801 has opening 804 through which spring holding member 380, which is an integral portion of bracket 300 in a currently preferred embodiment, protrudes. As shown, spring 811 is disposed in member 380 and secured to latch slider 801 via peg 810. Spring 811 exerts a force to the left to extend latch slider 801 such that latch slider 801 is extended underneath tab 203. As shown, heat stakes 805 extend through latch slider 801 and into latch rib 802, shown in dashed outline form in FIG. 8A. FIG. 8B shows one of heat stakes 805 coupled to latch tab 802. Each of the three heat stakes 805 extend through slots 305 in bracket 300 which were shown in dashed outline form in FIG. 3. The openings through which heat stakes 805 extend must have a sufficient length to allow for full motion of latch slider 801. Referring to FIG. 8B, the action of latch 800, as described generally above, can best be understood. As tabs 203 are brought upward as shown by arrows 601 of FIG. 6, i.e., tab 203 is below the position of portion 801a shown in FIG. 8B, the rounded portion of tab 203 contacts the angled portion 801a of latch slider 801. This translates some of the upward force into a lateral force exerted on latch slider 801 causing the spring 810 to compress and movement of latch slider 801, and attached rib 802 to the right. As tab 203 passes portion 801a, spring 810 forces latch slider 801 and latch tab 802 to the left to the locked position shown. In this position, the module 200 is essentially locked into place since the surfaces of tab 203 and portion 801a now in contact are straight edges parallel to the direction of movement of latch slider 801, so that no portion of a downward force can be translated into a lateral force on latch slider 801. Referring again to FIGS. 8A and 3, portion 203a of tab 203 will contact portion 306a of indent 306 in bracket 300 as handle 201 of module 200 is pulled on, preventing module 200 from being pulled out of bracket 300 when in the latched position. In practice, using the embodiment and materials described herein, the bracket 300 and module 200 assembly has a load carrying capacity of approximately 50 pounds. Therefore, handle 201, when the bracket 300 and module 200 assembly is in the latched position, can be used to carry module 200, bracket 300, and the attached personal computer 100.

One feature of the present invention is that the module 200 cannot be disengaged from the bracket 300 through accidental mechanical shock. This is due to the fact that typical shock will be in planes other than the plane of motion of latch slider 801 and will typically be at an angle of 90° to the axis of withdrawal. Furthermore, to disengage latches 800, latch tabs 802 must be pushed in an outward direction. Typically, shock around the edges of the bracket 300 will be in an inward direction. Finally, to disengage both of tabs 203 from latch slider 801, it is necessary to simultaneously push both of latch tabs 802 outward, i.e., in opposite directions from one another. Because the latch tabs 802 must be pushed in opposite directions simultaneously, it is highly unlikely that a single shock or force will accomplish this accidentally.

FIG. 8C shows bracket 300 during assembly. As shown, latch tab 802 comprises three heat stakes which extend through openings 305 and then into latch slider 801 and which are bonded thereto by thermal or ultrasonic bonding. Additionally, bracket 300 comprises holding plate 325 which is attached to module 200 by six heat stakes 326 on both sides of the holding plate 325. In addition to holding the latch mechanism in place, holding plate 325 provides structural strength to the arms of bracket 300, to increase the mechanical strength of the bracket 300 and to prevent the arm portions from breaking under various mechanical stresses which may occur. The use of six heat stakes on each side evenly distributes any forces which may be exerted upon the arm sections of bracket 300, so that holding plate 325 does not break or fall off under stress.

FIG. 9 shows a back view of bracket 300 and module 200 coupled to personal computer 100. As shown, door 120 of computer 100 is in the down position to expose various connection ports, such as those typically employed for printers, etc. As shown, connector 211 coupled to cable 210 is plugged into one such port 130, which is obscured by connector 211 in the Figure. Cable 210 and connector 211 couple portable personal computer 100 to the transceiver or other electronic components contained in module 200, described earlier. Also shown in the Figure is holder 212 which in a currently preferred embodiment is an opening slightly larger in size than connector 211 which provides a convenient holding place for connector 211 when module 200 is not in use. The position of cable 210 and connector 211 when connector 211 is stored in holder 21 2 is shown in dashed outline form. Connector 216 plugs into the other side of handle 201 and provides power to the electronics contained in module 200 via cable 215, and/or provides a mechanism for recharging battery 233 via connector 235a and cable 235.

Also shown in FIG. 9 is door holding tab 205, which in a currently preferred embodiment is made of a relatively soft material such as rubber, which can be slid up and then lifted over the door 120 to hold door 120 in an open position when module 200 is coupled to computer 100 as shown. Alternatively, door holding tab 205 may be made of polycarbonate or other materials, if desired. FIG. 10 shows holding tab 205, which has ribbed portion 205a for handling (i.e., to slide holding tab 205 up and down), back member 205b and a thin neck section 205c. Holding tab 205 is held in a slot within the body of module 200, the slot being wide enough to allow for movement of neck portion 205c within the slot with some friction. The slot has a length sufficient to allow holding tab 205 to be in the up position when it is holding door 120 down as shown in FIG. 9, or to be slid back to the down position as shown, for example, in FIGS. 6 and 7, wherein the top of the tab 205 extends just slightly above the upper surface of module 200 in a currently preferred embodiment.

FIG. 11 shows a side view of module 200 coupled to bracket 300 and computer 100. As shown, the back end of the combined module 200, bracket 300, and computer 100 rests on four feet 225 on module 200. With the dimensions described earlier, module 200 lifts the back end of computer 100 approximately 1¼ inches off of a surface. This is approximately ¾ inch higher than legs 115, when extended, so that use of module 200 in a currently preferred embodiment leads to a slightly greater tilt of the keyboard 107.

FIG. 12 shows a bottom view of module 200 latched in bracket 300 which is attached to personal computer 100. In a currently preferred embodiment legs 225 comprise four oval shaped rubber members disposed in oval shaped slots. The rubber members are essentially similar to rubber members 302a of bracket 300, described in conjunction with FIG. 3.

To unlatch module 200 from bracket 300, first, connector 211 is removed from socket 130 and placed in holder 212. Next, tabs 802 are pushed in the outward position. Note that tabs 802 are ribbed for ease of handling. Referring to FIG. 8B, by moving tab 802 to the right in the Figure, portion 801a of latch slider 801 will be moved beyond tab 203, such that tab 203 can move downward in the Figure. Referring to FIG. 12, it can be seen that the latch tabs 802 can be engaged with the users fingers on both sides of computer 100, while leaving module 200 on a surface such as a table, and thereafter lifting the front portion of personal computer 100 in an upward direction to disengage the module 200. Thereafter, personal computer 100 (and attached bracket 300) may be pulled away from module 200.

Thus, a bracket 300 and module 200 assembly for a portable personal computer has been described. Although specific embodiments, including specific dimensions, shapes, and materials have been described, various modifications to the disclosed embodiments will be apparent to one of ordinary skill in the art upon reading this disclosure. Therefore, it is to be understood that such embodiments are merely illustrative of and not restrictive on the broad invention and that this invention is not limited to the specific embodiments shown and described.

What is claimed is:

1. A bracket and module assembly for a portable personal computer comprising:

a bracket, said bracket being attachable to a body of a portable personal computer;

a module, said module and said bracket being rotatable about an axis from a first position to a second position with respect to one another, wherein said module comprises:

a transmitter and a receiver for enabling communications between said portable personal computer and a station in a network;

a cable and a connector for coupling said transmitter and said receiver to said portable personal computer; and a holder for holding said connector when said module is not coupled to said portable personal computer; and a latch member movably disposed with one of said bracket and said module, said latch member engaging a portion of the other of said bracket and said module when said bracket and said module are rotated from said first position to said second position with respect to one another, such that after said latch member has engaged said portion, said module is in a locked position with respect to at least one direction about said axis.

2. A bracket and module assembly for a portable personal computer comprising:

a bracket, said bracket being attachable to a body of a portable personal computer;

a module, said module and said bracket being rotatable about an axis from a first position to a second position with respect to one another;

a latch member movably disposed with one of said bracket and said module, said latch member engaging a portion of the other of said bracket and said module when said bracket and said module are rotated from said first position to said second position with respect to one another, such that after said latch member has engaged said portion, said module is in a locked position with respect to at least one direction about said axis, wherein said latch comprises a spring, said spring exerting a force on said latch member such that said latch member engages said portion by moving in a first direction against said force when said latch member contacts said portion, and by moving under said force in a second direction after said latch member has engaged said portion, and wherein said latch member further comprises a handling member moveable with said latch member to disengage said latch member from said portion.

3. The assembly as described in claim 2 wherein said module comprises a transmitter and a receiver for enabling communications between said portable personal computer and a station in a network.

4. The assembly as described in claim 2 wherein said bracket comprises an elongated section and a first arm extending from a first end of said elongated section and a second arm extending from a second end of said elongated section, wherein said module has a main section disposable between said first and said second arm, and wherein said assembly comprises a first said latch member and a first said portion disposed at said first arm and a first side of said main section, and a second said latch member and a second said portion disposed at said second arm and a second side of said main section.

5. The assembly as described in claim 2 wherein one of said module and said bracket comprises a slot and the other of said module and said bracket comprises a tab for pivotally coupling said module and said bracket.

6. A bracket and module assembly for a portable personal computer comprising:

a bracket, said bracket being attachable to a body of a portable personal computer;

a module, said module and said bracket being rotatable about an axis from a first position to a second position with respect to one another;

a latch member movably disposed with one of said bracket and said module, said latch member engaging a portion of the other of said bracket and said module when said bracket and said module are rotated from said first position to said second position with respect to one another, such that after said latch member has engaged said portion, said module is in a locked position with respect to at least one direction about said axis, wherein one of said module and said bracket comprises a slot and the other of said module and said bracket comprises a tab for pivotally coupling said module and said bracket.

7. The assembly as described in claim 6 wherein said module comprises a transmitter and a receiver for enabling communications between said portable personal computer and a station in a network.

8. The assembly as described in claim 6 wherein said bracket comprises an elongated section and a first arm extending from a first end of said elongated section and a second arm extending from a second end of said elongated section, wherein said module has a main section disposable between said first and said second arm, and wherein said assembly comprises a first said latch member and a first said portion disposed at said first arm and a first side of said main section, and a second said latch member and a second said portion disposed at said second arm and a second side of said main section.

9. A bracket and module assembly for a portable personal computer comprising:

a bracket, said bracket being attachable to a body of a portable personal computer;

a module, said module and said bracket being rotatable about an axis from a first position to a second position with respect to one another;

a latch member movably disposed with one of said bracket and said module, said latch member engaging a portion of the other of said bracket and said module when said bracket and said module are rotated from said first position to said second position with respect to one another, such that after said latch member has engaged said portion, said module is in a locked position with respect to at least one direction about said axis, further comprising a portable personal computer, wherein a back section of said portable personal computer comprises a door, and wherein said module comprises a retention tab for holding said door in an open position.

* * * * *